United States Patent
Paul et al.

(10) Patent No.: US 7,755,799 B2
(45) Date of Patent: Jul. 13, 2010

(54) METHOD AND SYSTEM TO COMPENSATE FOR BANDING DEFECTS

(75) Inventors: Peter Paul, Webster, NY (US); Sahand Rabbani, Pittsford, NY (US); William J. Nowak, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 512 days.

(21) Appl. No.: 11/837,688

(22) Filed: Aug. 13, 2007

(65) Prior Publication Data
US 2009/0046325 A1 Feb. 19, 2009

(51) Int. Cl.
H04N 1/409 (2006.01)
H04N 1/58 (2006.01)
H04N 1/29 (2006.01)
G03G 21/14 (2006.01)
G03G 15/00 (2006.01)

(52) U.S. Cl. .................. 358/1.9; 358/3.26; 358/300; 399/78; 399/167

(58) Field of Classification Search .................. 358/1.9, 358/1.7, 3.26, 3.06, 463, 300; 399/76, 78, 399/40, 46, 53, 167
See application file for complete search history.

(56) References Cited

U.S. PATENT DOCUMENTS

| 6,456,808 | B1* | 9/2002 | Chen et al. ............... 399/167 |
| 7,054,568 | B2 | 5/2006 | Mizes et al. |
| 7,058,325 | B2 | 6/2006 | Hamby et al. |
| 2002/0159791 | A1 | 10/2002 | Chen et al. |
| 2006/0001911 | A1 | 1/2006 | Viassolo et al. |
| 2006/0251437 | A1 | 11/2006 | Donaldson |
| 2007/0052991 | A1 | 3/2007 | Goodman et al. |
| 2007/0139509 | A1 | 6/2007 | Mizes et al. |
| 2007/0236747 | A1 | 10/2007 | Paul |
| 2008/0118273 | A1* | 5/2008 | Ogata et al. ............... 399/167 |
| 2009/0002724 | A1* | 1/2009 | Paul et al. ............... 358/3.26 |

* cited by examiner

*Primary Examiner*—Scott A Rogers
(74) *Attorney, Agent, or Firm*—Fay Sharpe LLP

(57) ABSTRACT

A method of correcting periodic banding defects in a printing system is provided. The method comprises: determining a banding profile estimate; determining a compensation profile; adjusting the compensation profile based on the transfer function of a motion system and the transfer function of a printing system; waiting until a defect once-around signal returns; and applying the output of the adjustment step to a controller controlling the speed of an imaging surface.

16 Claims, 9 Drawing Sheets

METHOD AND SYSTEM TO COMPENSATE FOR BANDING DEFECTS

CROSS REFERENCE TO RELATED PATENTS AND APPLICATIONS

The following patents and applications, the disclosures of each being totally incorporated herein by reference, are mentioned:

U.S. Pat. No. 7,054,568, entitled "METHOD AND APPARATUS FOR CONTROLLING NON-UNIFORM BANDING AND RESIDUAL TONER DENSITY USING FEEDBACK CONTROL," to Mizes et al.;

U.S. Pat. No. 7,058,325, entitled "SYSTEMS AND METHODS FOR CORRECTING BANDING DEFECTS USING FEEDBACK AND/OR FEEDFORWARD CONTROL, to Hamby et al.;

U.S. Publication No. 2007/0139509 published Jun. 21, 2007, entitled "COMPENSATION OF MPA POLYGON ONCE AROUND WITH EXPOSURE MODULATION," by Howard A. Mizes et al.;

U.S. application Ser. No. 11/399,100 (Attorney Docket 20051634-US-NP), filed Apr. 6, 2006, entitled "SYSTEMS AND METHODS TO MEASURE BANDING PRINT DEFECTS," by Peter Paul; and U.S. application Ser. No. 11/769,044 Attorney Docket 20061185-US-NP), entitled BANDING PROFILE ESTIMATOR USING MULTIPLE SAMPLING PERIODS, by Peter Paul et al.

BACKGROUND

The exemplary embodiment disclosed herein relates to document processing systems. It finds particular application in conjunction with sensing and control of banding and will be described with particular reference thereto. However, it is to be appreciated that the exemplary embodiment is also amenable to other like applications.

By way of background, in a typical printing system, a photoconductive drum or photoreceptor (PR) rotates at an angular velocity. See, for example, U.S. Publication No. 2006/0251437, entitled "TONE REPRODUCTION CURVE SYSTEMS AND METHODS," which is incorporated by reference herein. As the photoconductive drum rotates, the photoconductive drum is electrostatically charged. A latent image is exposed line by line onto the photoconductive drum using a scanning laser, for example, using a rotating polygon mirror. The latent image is developed by electrostatically adhering toner particles to the photoconductive drum. The developed image is transferred from the photoconductive drum to the output media such as paper. The toner image on the paper is fused to the paper to make the image on the paper permanent. The surface of the photoconductive drum is cleaned to remove any residual toner on the surface of the photoconductive drum.

Typically, the printing device drives the photoconductive drum using a motor drive system or a motor drive train. The motor drive system has a substantial amount of external loading because it typically drives the auxiliary rollers and transports the paper through a series of gear trains. With the additional external loading, as well as periodic disturbances due to imperfections in the series of gear trains, the motor drive system imparts a varying velocity on the photoconductive drum.

The varying photoconductive drum velocity causes scan line spacing variation in the printed image. The scan line spacing variation is a significant contributor of artifacts in the marking process. For example, halftone banding caused by scan line spacing variation is one of the most visible and undesirable artifacts, appearing as light and dark streaks across a printed page perpendicular to the process direction.

Banding is thus defined as a one dimensional image density variation in the process direction. It is often periodic and it can result from errors in the mechanical motion of rotating components within a marking engine. These components may be gears, pinions, and rollers in the charging and development subsystems, photoreceptors and their drive trains, or the ROS polygon. Several methods have been proposed to perform feedback compensation of banding using image based controls techniques. Such methods involve measuring the banding induced density variation using an imaging system such as an offline scanner or an in situ full width array sensor, or a point sensor such as an ETAC. Based on the density variation, a controller calculates a periodic compensation signal that is injected into the system, either into the imager (ROS), into a power supply to effect a bias, or into the image itself. These methods require an accurate profile of the density variation. Since the density variation is periodic, it can be characterized by the frequency, amplitude, and phase of its fundamental, as well as its harmonics. The frequency of the banding defect can be measured using Fourier analysis, but is typically known ahead of time based on the mechanical design of the marking system.

Of the three banding characteristics, frequency, amplitude, and phase, banding phase is probably the most difficult characteristic to measure. However, for feedback compensation, it may be the most important characteristic. Banding phase is difficult to measure since, relative to the printed page, it varies from page to page. That is, the banding may have a density peak at the beginning of page one, but may have a density trough at the beginning of page two. Thus, if one measured page one, and determined that the phase was such that a density peak occurs at the beginning of each page, upon applying a corresponding compensation to page two, poor performance would result—the banding may even be enhanced by the control system, rather than suppressed. The problem is that the banding source is not synchronous with the print. Thus, one cannot use the print as a phase reference.

Actuation problems for banding compensation also occur. For example, in using the image itself for banding compensation, phase synchronization is difficult as the page is usually not synchronous with the banding source. Further, use of the image has limitations in solid areas in terms of amplitude quantization and in the potentially high cost of image computations. Use of exposure modulation for banding compensation can also have limitations in terms of exposure bandwidth, noise rejection, and potentially high cost exposure system modifications. The photoreceptor servo control system attempts to minimize the effect of banding defects. However, the shaft encoder typical of these systems does not measure the photoreceptor surface velocity, which is the key parameter for banding print defects. Further, encoders can have run-out and have their own inherent error sources.

Thus, there is a need for a method and system that compensates for the periodic banding defects by measuring the output density variation in interdocument zones, customer image zones, or on printed pages and then modulating the rotational speed of the photoreceptor shaft using its motor.

BRIEF DESCRIPTION

The exemplary embodiment proposes a method and system to vary the rotational speed of the photoreceptor shaft slightly and periodically to modulate exposure per unit area on the photoreceptor surface. By controlling the exposure per unit area using the photoreceptor speed, the system is able to compensate for banding print defects.

In accordance with an aspect of the exemplary embodiment, a method of correcting periodic banding defects in a printing system is provided. The method comprises: determining a banding profile estimate; determining a compensation profile; adjusting the compensation profile based on the transfer function of a motion system and the transfer function of a printing system; waiting until a defect once-around signal returns; and applying the output of the adjustment step to a controller controlling the speed of an imaging surface.

In accordance with another aspect of the exemplary embodiment, a system for correcting periodic banding defects in a printing system is provided. The system comprises: a first module operative to determine a banding profile estimate; a second module operative to determine a compensation profile; a third module operative to adjust the compensation profile based on the transfer function of a motion system and the transfer function of a printing system; a fourth module operative to wait until a defect once-around signal returns; and a fifth module operative to apply the output of the adjustment step to a controller controlling the speed of an imaging surface.

In accordance with yet another aspect of the exemplary embodiment, a system is provided. The system comprises: a printer having an imaging surface; one or more defect once-around sensors; an imaging surface; a defect estimator that uses timing information to produce a synchronous defect estimate; a transfer function that translates a defect profile, in units of scanner reflectance or pixel value; a function generator that is triggered on the defect source once-around signal and outputs a continuous string of correction profiles at the frequency of the defect; and a controller that translates the correction profile voltage level into a signal that controls the speed of the imaging surface.

DETAILED DESCRIPTION

Figure 1:
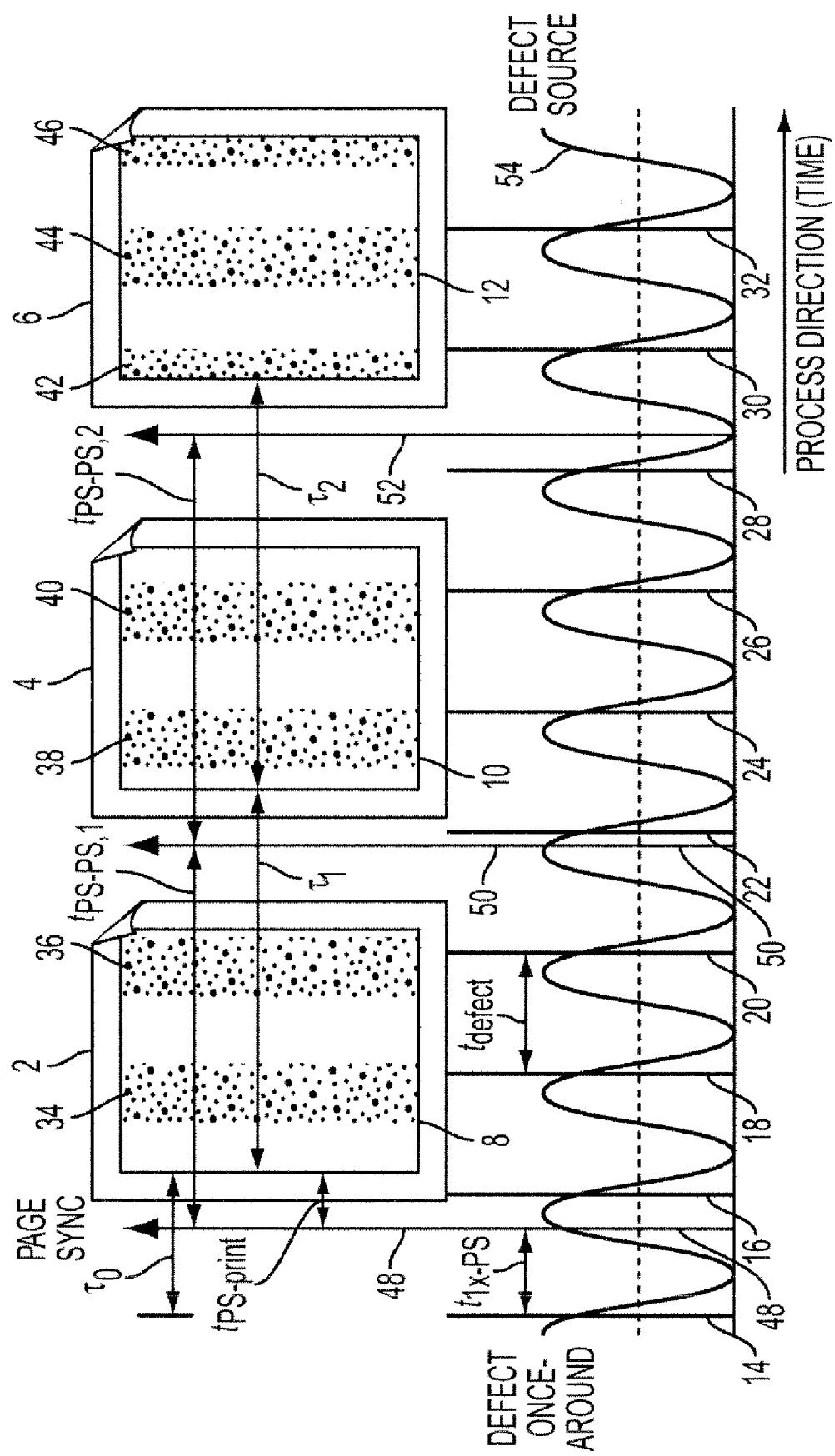
FIG. 1 illustrates banding print defects over time.

Referring now to the drawings wherein the showings are for purposes of illustrating the exemplary embodiments only and not for purposes of limiting the claimed subject matter, a series of images processed by a printing system in a process direction (i.e., the direction of the paper travel in the printing system) is shown in FIG. 1. Consider a print job of M pages, the first three of which are shown in FIG. 1. The boxes with the folded upper right hand corners depict pieces of paper 2, 4, and 6 with printed images or test targets 8, 10, and 12, respectively. They could represent any known sampling interval, such as interdocument zones, customer image zones, or printed pages. The images 8, 10, and 12 on the pieces of paper 2, 4, and 6 represent test targets designed for defect estimation. In the absence of banding defects, the printed test image should be a uniform midtone (i.e., approximately 50% area coverage). Because of banding from mechanical components within the printer, however, the printed test targets 8, 10, and 12 are not uniform in density, but have a periodic density variation in the process direction. Note that the frequency and amplitude of the banding is roughly the same for each test print, but the banding phase relative to the first imaged line is different on every page. In order to efficiently estimate the defect profile, timing information that will place every imaged page relative to the banding source, which is independent of the start of the page, will have to be obtained.

The banding source (or defect) once-around is represented by a series of vertical lines (14, 16, 18, 20, 22, 24, 26, 28, 30 and 32). This signal may be obtained by placing a low cost once-around sensor on the defect source in the printer. This once-around signal corresponds to the periodic thick, dark lines (34, 36, 38, 40, 42, 44, and 46) in the images 8, 10 and 12. The page sync signal, available on any printer, is marked by a series of impulses 48, 50 and 52. The banding defect is represented by a waveform 54, whose one-period profile is to be estimated.

Figure 2:
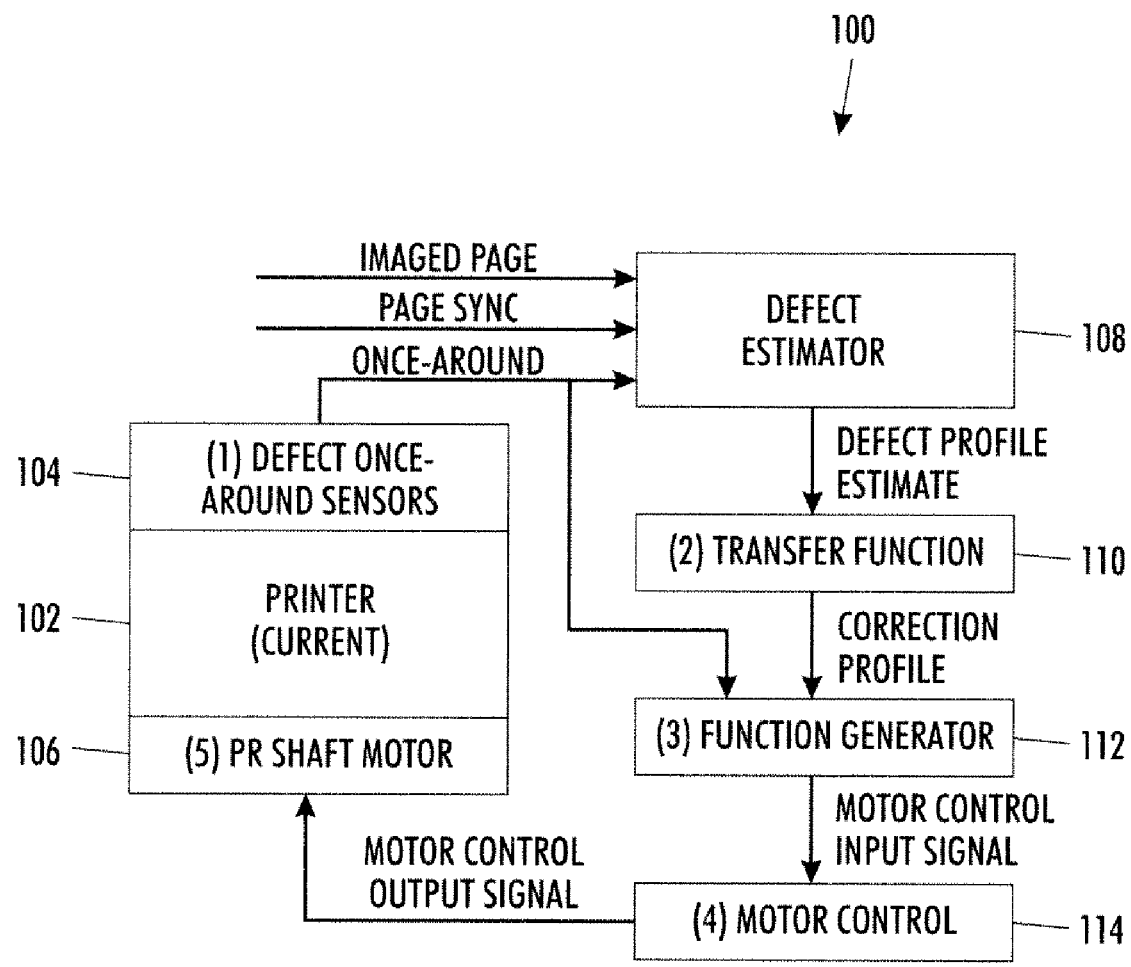
FIG. 2 is a block diagram of a system suitable for implementing aspects of the exemplary method.

An exemplary method of correcting periodic motion quality banding defects requires a few additional modules in the printing system. FIG. 2 depicts a printing system 100 suitable for implementing such a method. The printing system 100 generally includes a printer 102 with one or more defect once-around sensors 104 and an imaging surface 106, a defect estimator 108, a transfer function 110, a function generator 112, and a controller 114.

The printer 102 is an electrophotographic printer. However, with a redefinition of components known to a practitioner of the art the printing system could also be an aqueous ink jet printer or a solid ink printer.

A once-around timing signal can be provided by the banding source, either by electronic design or through the use of one or more reflective sensors 104. This once-around timing signal corresponds to the periodic dark lines in FIG. 1. Thus, the defect once-around sensors 104 may be used to detect for any defect source that is to be corrected. These are discrete sensors that generate a pulse when the once-around occurs.

As shown in FIG. 2, the imaging surface 106 may comprise a photoreceptor (PR) belt or drum having a motor. The motor thus drives the PR shaft according to the output of the control module 114. The shaft rotational speed will vary periodically with the defect source for which is to be compensated; however, the mean once-around time of the shaft generally remains at around the PR frequency (which is generally 1.7592 Hz for a certain class of printers). It is to be understood, however, that the imaging surface 106 may also comprise an imaging drum, an imaging belt, or a printed page.

The defect estimator 108 uses timing information to produce a synchronous defect estimate. Examples of suitable defect estimators will be described in greater detail below.

The transfer function 110 translates a defect profile, in units of scanner reflectance or pixel value, into a correction profile that is fed to the input of the motor control module. This module inverts the defect profile and may also compensate for distortion and motor phase lag based on previous calibration experiments.

The function generator 112 is triggered on the defect source once-around signal, outputting a continuous string of correction profiles at the frequency of the defect. The correction profile voltage level is proportional to the desired rotational speed of the motor.

The motor control module 114 translates the correction profile voltage level into a signal that controls the speed of the imaging surface 106. This module may entail a frequency modulator, whose output is a signal with varying frequency proportional to the voltage input.

Figure 3:
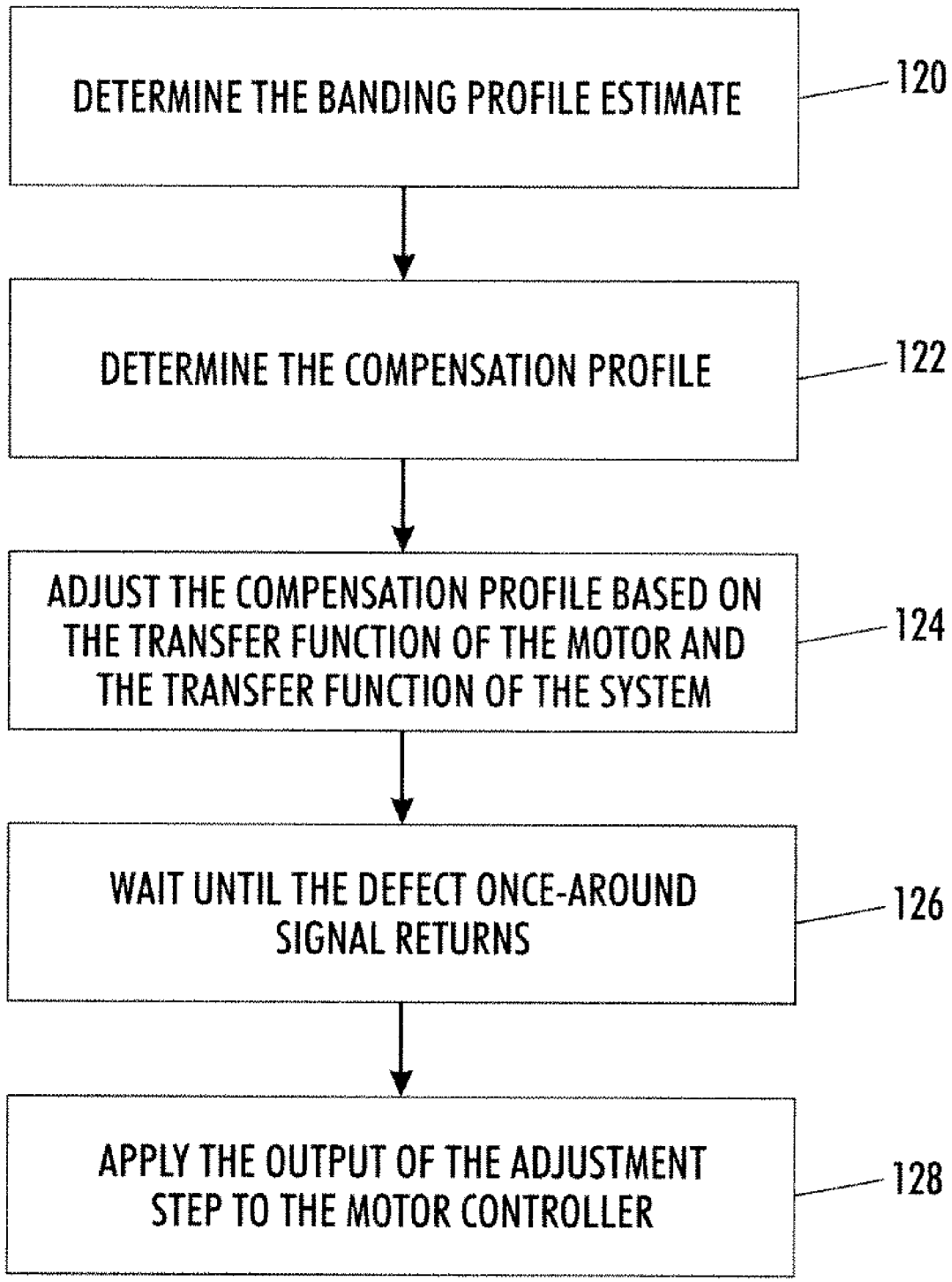
FIG. 3 is a flow chart of the exemplary method.

A method of correcting periodic motion quality banding defects is outlined in FIG. 3. The method generally includes: (a) determining the banding profile estimate (120); (b) determining a compensation profile (122); (c) adjusting the compensation profile based on the transfer function of the imaging surface 106 (desired speed to actual speed, including the phase lag and amplitude response of the motor at the banding defect frequency) and the transfer function of the system (imaging surface speed to density change); (d) waiting until the defect once-around signal returns (126); and (e) applying the output of the adjustment step (124) to the controller 114 (128).

Figure 4:
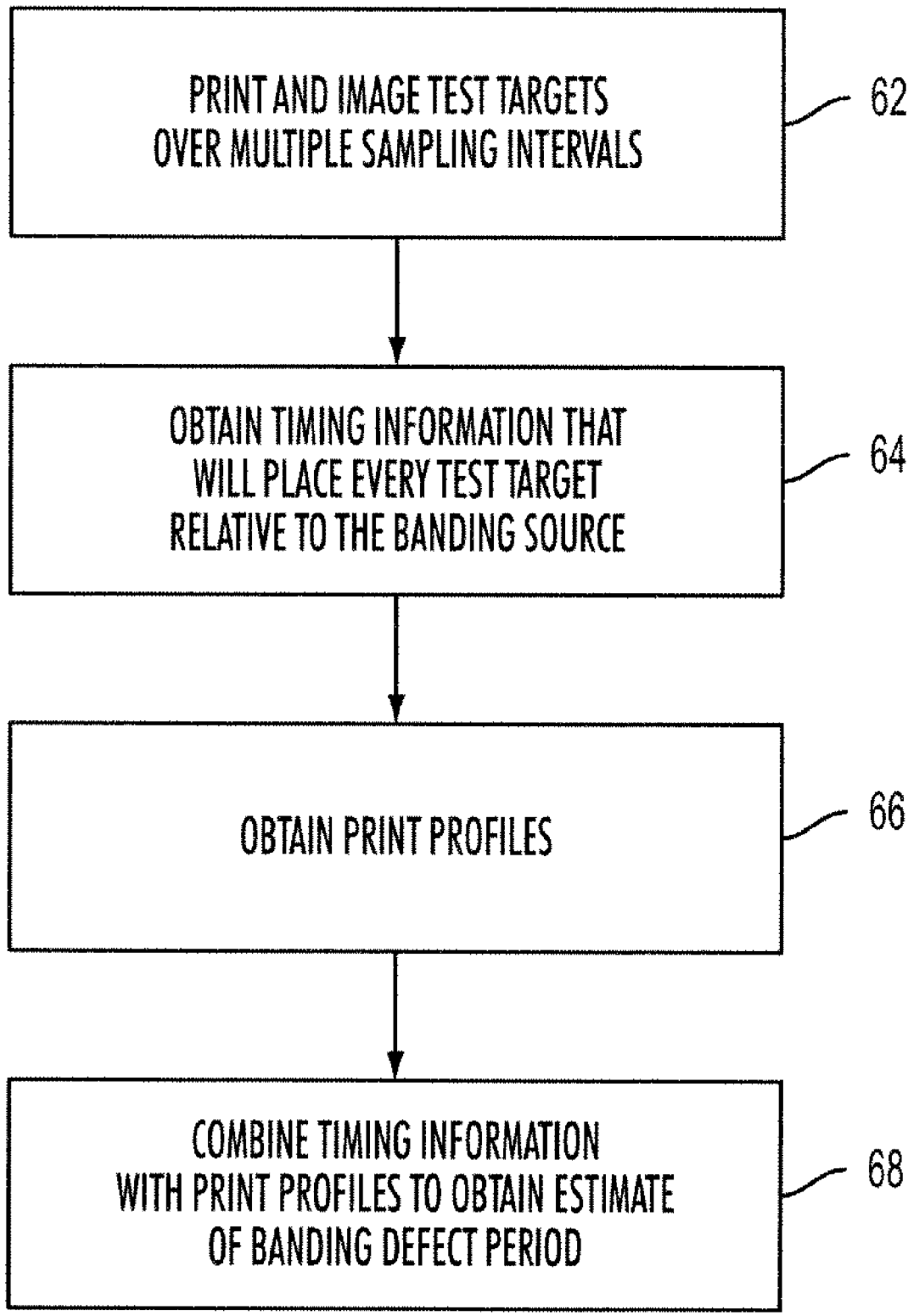
FIG. 4 is a flow chart of a method of estimating a banding profile.

Regarding step 120, an exemplary method of estimating the banding defect profile is shown in FIG. 4 and generally includes printing and imaging test targets over multiple sampling intervals (140), obtaining timing information that will place every test target relative to the banding source (142), obtaining print profiles (144), and combining the timing information with the print profiles to obtain an estimate of the banding defect period (146).

Important time quantities in the analysis include: $t_{1x\text{-}PS}$, the time from the defect once-around signal to the page sync, $t_{PS\text{-}print}$, the time from the page sync to the start of the imaged page, $t_{PS\text{-}PS,m}$, the time from the page sync impulse m−1 to the impulse m, $t_{defect}$, the defect period, $\tau_0$, the time from the defect once-around to the start of the first imaged page, and $\tau_m$, the time from the start of page m−1 to the start of page m.

The desired quantities that will place the imaged pages relative to the defect once-around are indexed by m for m={0, 1, . . . , M−1}. The quantity $t_{1x\text{-}PS}$ will be distinct for every print job, and must be measured by a timer every time this system is executed. The quantity $t_{PS\text{-}print}$ is stable for a given printer (to the tens of nanosecond timescale, since the page sync signals drive the imaging system) and can be measured once and hardwired into the system. Further, the page-sync-to-page-sync delay $t_{PS\text{-}PS,m}$ is measured directly for every print—it varies from print to print so it is indexed by m. The banding period $t_{defect}$ is known, since the banding sources can be enumerated and their periods are documented. Other parameters that will help in the analysis include y, the scan resolution in pixels per distance, $v_p$, the process speed in distance per time, $f_s$, the sampling frequency, and N, the number of pixels in the imaged print along the process direction.

Note that the sampling frequency can be determined from the first two quantities:

$$f_s = y \times v_p \tag{1}$$

The value of $\tau_0$ can be obtained easily from known or measured quantities:

$$\tau_0 = t_{1x\text{-}PS} + t_{PS\text{-}print} \tag{2}$$

The values of the remaining $\tau_m$ will be equal to the page-sync-to-page-sync delay times, which are easily measured by a timer. That is, $$\tau_m = t_{PS\text{-}PS,m} \text{ for } m=\{0,1,\ldots,M-1\} \tag{3}$$

Once all values of $\tau_m$ have been obtained, the time elapsed from a defect once-around signal to the beginning of any page m can be determined:

$$T_m = \sum_{i=0}^{m} \tau_i \tag{4}$$

Thus, the timing information for calculating the estimate is now available. Next, the print profiles are to be obtained. Thus, the next step is to scan and crop each of the M prints to obtain matrices corresponding only to the imaged patch on each print. For each print m, calculate an N-point vector whose $n^{th}$ element is $x_m[n] \in \Re$ and represents the average of the pixel values in the $n^{th}$ column of the image matrix orthogonal to the process direction. Note that this can be obtained by an offline scanner or an in situ full width array. In addition, since only a one dimensional profile is required, a point sensor, such as an ETAC sensor, may be used.

Now, combine the timing information with the print profiles to obtain an estimate of the banding defect period. The banding frequency $f=1/t_{defect}$ is known. Therefore, a matched-filter for the sinusoid at the fundamental banding frequency f can be designed:

$$R(f) = \frac{1}{N} \sum_{m=0}^{M-1} \sum_{n=0}^{N-1} x_m[n] e^{-j2\pi f\left(\frac{n}{f_s} + T_m\right)} \tag{5}$$

The amplitude and phase estimates of the defect are, respectively, $$\hat{A}(f) = \frac{1}{M} |R(f)| \tag{6}$$

$$\hat{\phi}(f) = \angle R(f) \tag{7}$$

This analysis is then extended to all of the harmonics of the defect frequency. The defect will have amplitude and phase for sinusoidal components at a spectrum of frequencies kf for k={0, 1, . . . , P−1}, where $P=f_s t_{defect}$ is the defect period in samples. For each k, an estimate of the magnitude and phase of the corresponding sinusoidal component may be obtained by calculating the metric R(kf) and applying Equations 6 and 7. The estimate of the banding defect profile is thus expressed as:

$$\hat{x}[n] = \sum_{k=0}^{P-1} \hat{A}(kf) \cos\left(2\pi \frac{n}{f_s} kf + \hat{\phi}(kf)\right), \text{ for } n = \{0, 1, \ldots, P-1\} \tag{8}$$

Figure 5:
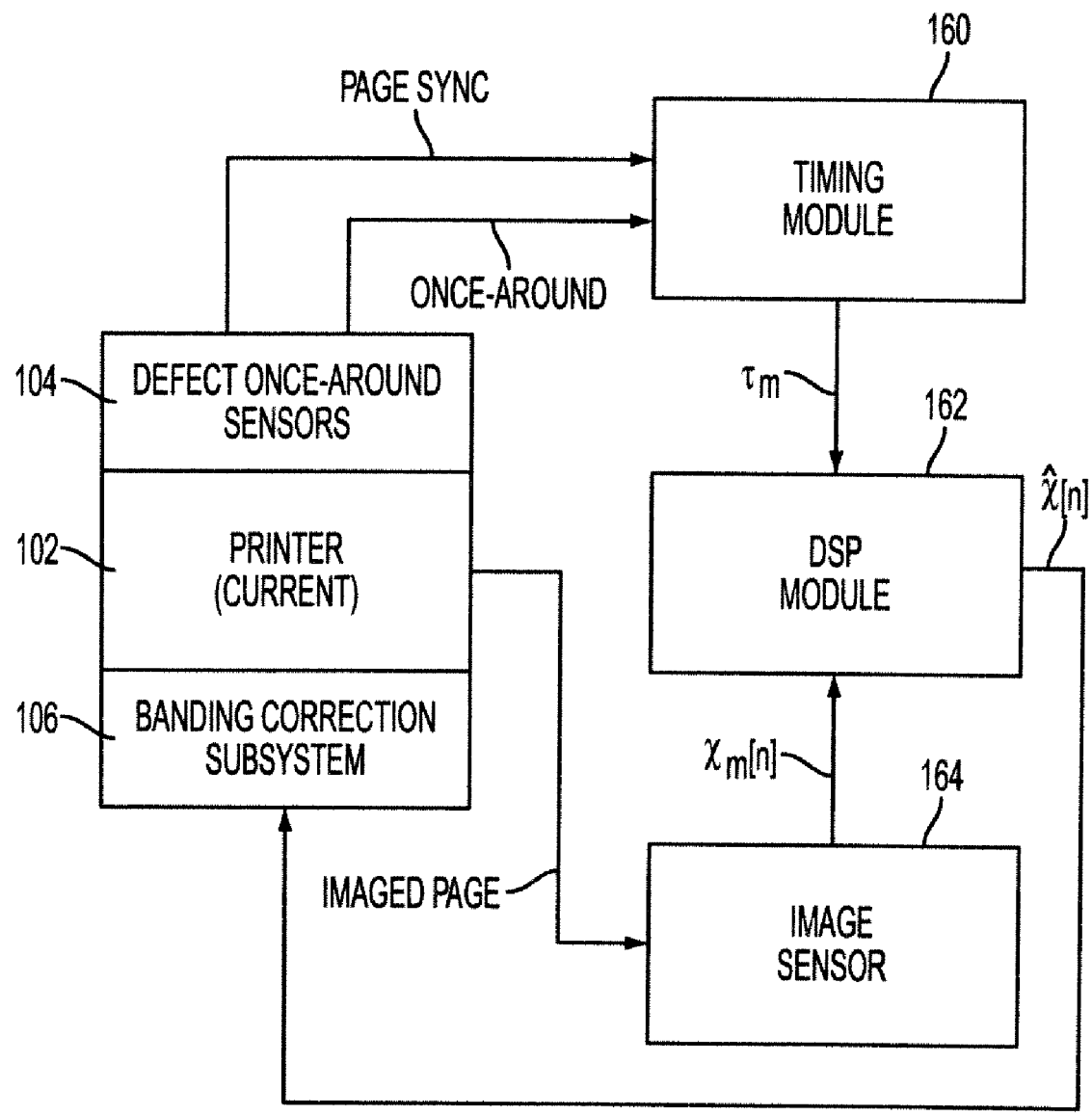
FIG. 5 is a block diagram of a system suitable for implementing the method of FIG. 4.

With reference now to FIG. 5, the defect once-around sensor(s) 104 send a page sync and a once-around signal to a timing module 160, which calculates $t_{1x\text{-}PS}$ and the page-sync-to-page-sync delays $t_{PS\text{-}PS,m}$. The timing module 160 could be created from programmable logic chips that would count clock cycles between the page sync and once-around signals. The timing module 160 also has a primitive arithmetic logic unit to obtain the value of $\tau_0$, in addition to those $\tau_m$ for m={1, 2, . . . , M−1}, which are directly measured. Since these are simple calculations, very little space on a FPGA would be required.

An image sensing module 162 is also included. One alternative calls for an offline scanner manned by a printer technician or customer who would be asked to calibrate the printer periodically to update banding estimates. Another, more automated, alternative calls for an in-situ sensor or sensing array. This scanning module may produce the M N-point print profiles $x_m[n]$. This could also be a point density sensor (ETAC).

The outputs of the timing and image sensing (or scanning) modules are forwarded to a Digital Signal Processing (DSP) module 164, which calculates the defect profile estimate using the equations derived above. The DSP module 164 typically consists of a microprocessor and memory needed to calculate the equations of the matched-filter based algorithm.

The defect estimate $\hat{x}[n]$ produced by the DSP module 164 is fed to a banding correction module on the printer 102, which can use the estimated profile to compensate for the banding defect.

It should be noted that the banding sources are generally not synchronous with the page and, further, many occur at relatively low frequencies, admitting only a few periods per page. Thus, to efficiently estimate a source's defect profile, multiple imaged pages may be required. Because multiple prints are separated by interdocument zones, data on the defect may incomplete and in such cases may only be coherently integrated with the correct page-to-page timing information, which is generally variable and difficult to measure with arbitrarily high accuracy. This variability results in misaligned phase, compromising defect profile estimation. This problem, which is called "phase jitter," may explain the difficulties with coherently combining data from multiple imaged pages.

Alternatively, estimation of the banding defect may be made through the implementation of a high signal-to-noise ratio statistical signal processing algorithm that intelligently integrates the error-prone timing information from the defect once-around and page sync signals and the data from multiple printed images. Specifically, this method may be used (1) to in situ determine the optimal number of pages (for each frequency) to use for defect profile estimation to exploit the higher frequency resolution offered by multiple pages while minimizing the effect of phase jitter and (2) to estimate the phase and amplitude of defect sources using this optimal number of pages.

Figure 6:
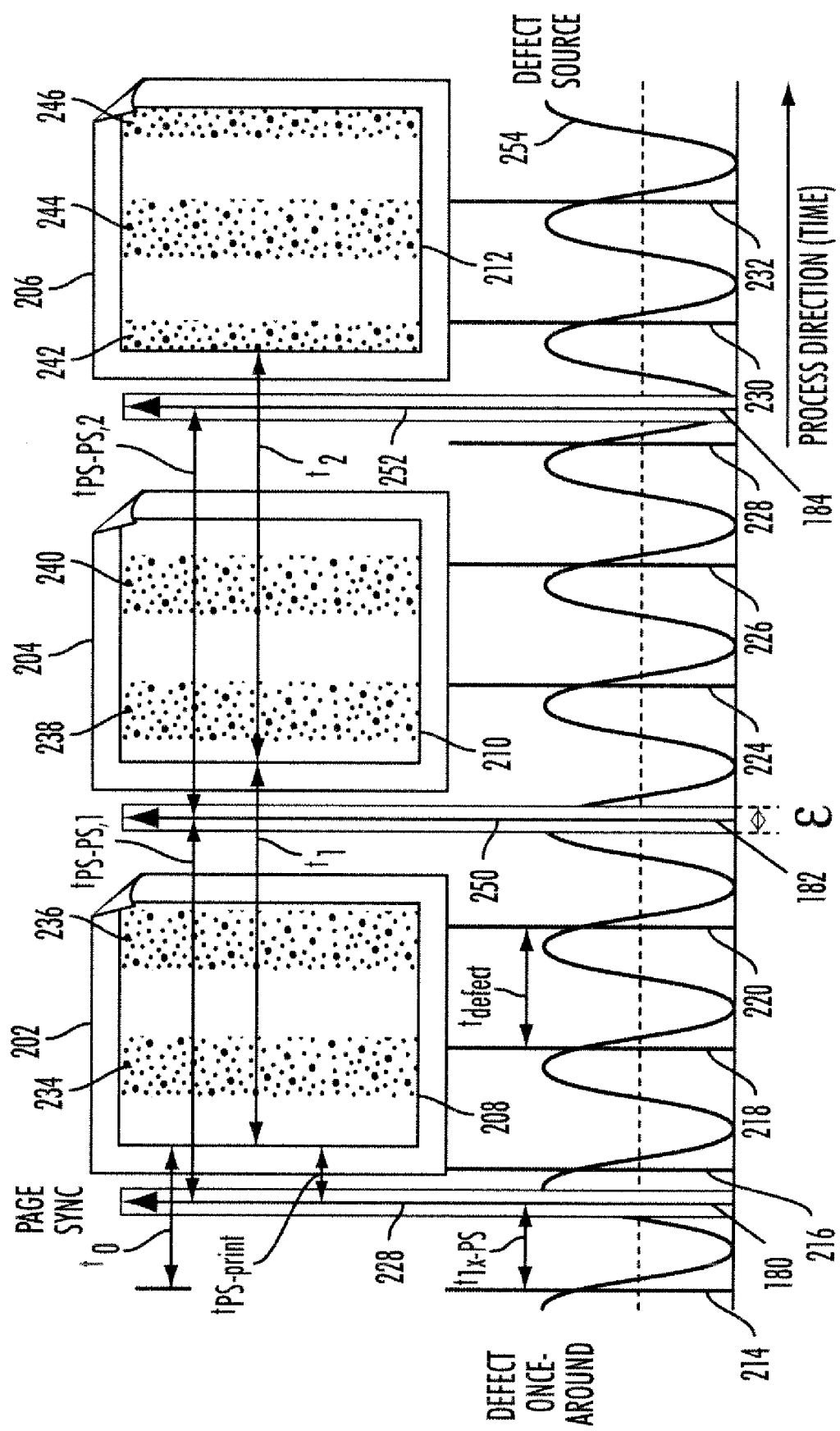
FIG. 6 illustrates banding print defects over time with phase jitter.

A series of images processed in a process direction (i.e., the direction of the paper travel in the printing system) is shown in FIG. 6, which closely resembles FIG. 1. The timing information includes the time from the first page sync impulse 180 to the second page sync impulse 182, from the second page sync impulse 182 to the third page sync impulse 184, and so on. This measurement, however, is prone to error $\epsilon$, which may be illustrated graphically with the error bars around the page sync impulses 180, 182 and 184.

Figure 7:
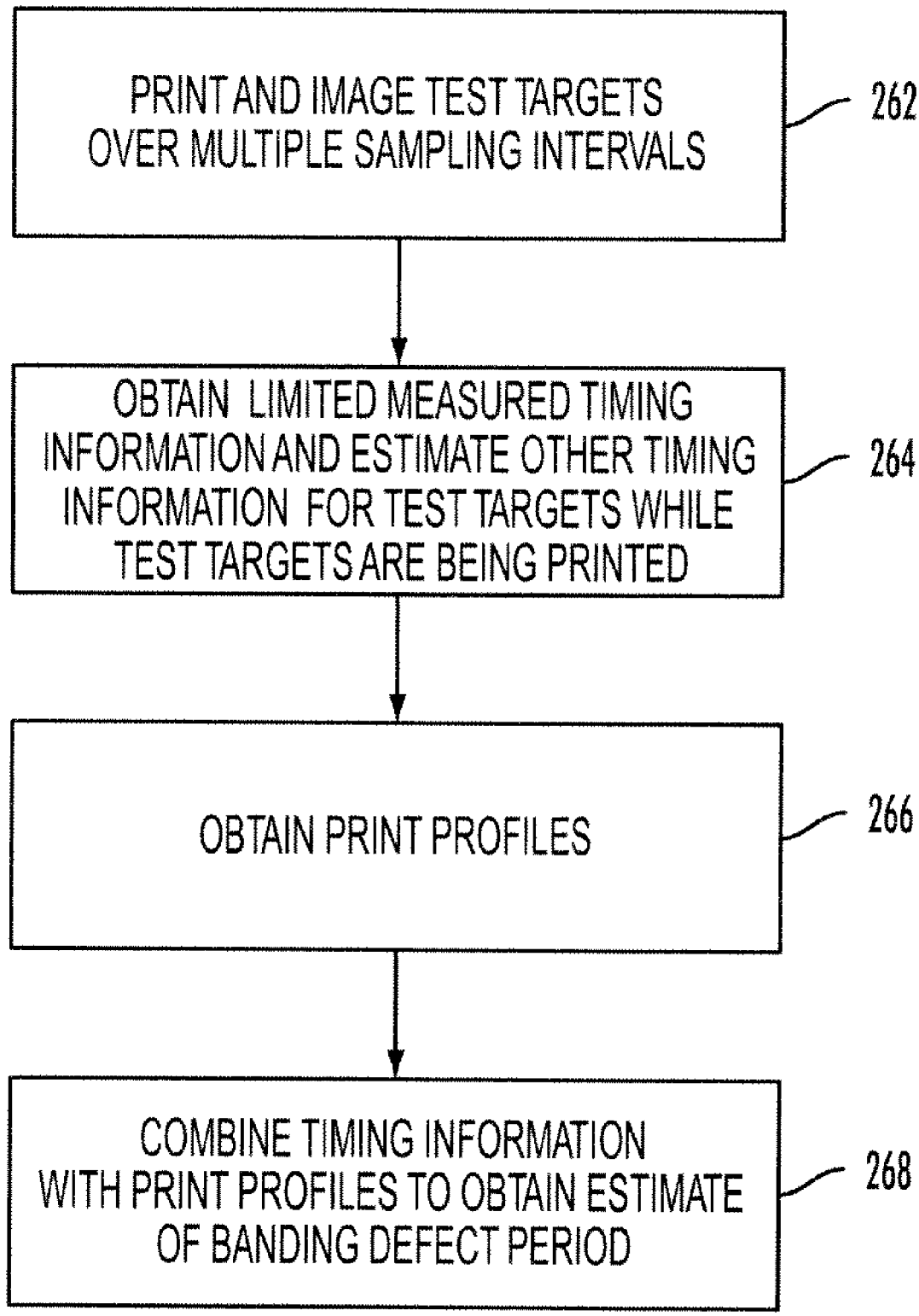
FIG. 7 is a flow chart of an alternative method of estimating a banding profile.

A method of measuring banding print defects over optimal pages is shown in FIG. 7 and includes printing and imaging test targets over multiple sampling intervals (202), obtaining limited measured timing information and estimating other timing information while the test targets are being printed (204), obtaining print profiles (206), and combining the timing information with the print profiles to obtain an estimate of the banding defect period (208). Important time quantities in the analysis include $t_{1x\text{-}PS}$, the observed time from the defect once-around signal to the page sync, $t_{PS\text{-}print}$, the time from the page sync to the start of the imaged page, $t_{PS\text{-}PS,m}$, the observed time from page sync impulse m−1 to impulse m, $t_{defect}$, the defect period, $\tau_0$, the true time from the defect once-around to the start of the first imaged page, $\hat{\tau}_0$, the observed time from the defect once-around to the start of the first imaged page, $\tau_m$, the true time from the start of page m−1 to the start of page m, $\hat{\tau}_m$, the observed time from the start of page m−1 to the start of page m, $\epsilon_m$, the error in measurement of $\tau_m$ equal to $\hat{\tau}_m - \tau_m$. The desired quantities that will place the imaged pages relative to the defect once-around are all m for m={0, 1, . . . ,M−1}. The quantity $t_{1x\text{-}PS}$ will be distinct for every print job, and must be measured by a timer, which will introduce some error $\epsilon_m$. The quantity $t_{PS\text{-}print}$ is stable for a given printer and can be measured once and hardwired into the system. Further, the page-sync-to-page-sync delay $t_{PS\text{-}PS,m}$ may be somewhat stable when the printer enters a steady-state mode, but is subject to some variability. The banding period $t_{defect}$ is known, since the banding sources can be enumerated and their periods are documented. Other parameters that will help in the analysis include y, the scan resolution in pixels per distance, $v_p$, the process speed in distance per time, $f_s$, the sampling frequency, and N, the number of pixels in the imaged print along the process direction.

Note that the sampling frequency can be determined from the first two quantities:

$$f_s = y \times v_p \tag{13}$$

The value of $\hat{\tau}_0$ can be obtained easily from known or measured quantities:

$$\hat{\tau}_0 = t_{1x\text{-}PS} + t_{PS\text{-}print} \tag{14}$$

The values of the remaining $\hat{\tau}_m$ are equal to the observed page-sync-to-page-sync times, $$\hat{\tau}_m = t_{PS\text{-}PS,m}, \text{ for } n = \{0, 1, \ldots, P-1\} \tag{15}$$

When the printer enters a steady-state mode, the page-sync-to-page-sync delay time becomes relatively consistent. In this case, the mean value of the PS-PS time may be assumed as determined from previous experimentation. This value is called $t_{PS\text{-}PS,\mu}$. If it is assumed $t_{PS\text{-}PS,m} = t_{PS\text{-}PS,\mu}$ for m={1, 2, . . . ,M−1}, then phase jitter is introduced from the variability in the PS-PS time.

The limited timing information required to be measured during the printing of the test target is the quantity $t_{1x\text{-}PS}$, which is the defect once around to page sync time delay. The timing information that is not directly measured, but is estimated is $t_{PS\text{-}PS,m}$, which is the page sync to page sync time delay. Instead of the measured value, the average value is used, $t_{PS\text{-}PS,\mu}$. This avoids measuring this quantity in real time, which may reduce overall system cost.

Once all values of $\hat{\tau}_m$ have been obtained, the observed time elapsed from a defect once-around signal to the beginning of any page m can be determined:

$$\hat{T}_m = \sum_{i=0}^{m} \hat{\tau}_i \tag{16}$$

If the actual time elapsed from a defect once-around signal to the beginning of the $m^{th}$ page is called $T_m$, then $\hat{T}_m$ is expressed as the sum of a desired term and an error term:

$$\hat{T}_m = \sum_{i=0}^{m} \hat{\tau}_i = \sum_{i=0}^{m} (\tau_i + \varepsilon_i) = \sum_{i=0}^{m} \tau_i + \sum_{i=0}^{m} \varepsilon_i = T_m + \sum_{i=0}^{m} \varepsilon_i \tag{17}$$

As m grows, the error term of $\hat{T}_m$ compounds such that timing estimates for later pages have higher phase jitter. That is, the variance (or phase jitter) of $\hat{T}_m$ increases with m.

Next, the print profiles are obtained. Each of the M prints is scanned and cropped to obtain matrices corresponding only to the imaged patch on each print. For each print m, calculate an N-point vector whose $n^{th}$ element is $x_m[n] \in \Re$ and represents the average of the pixel values in the $n^{th}$ column of the image matrix orthogonal to the process direction.

For each print m, combine the noisy time measurement from the banding source once-around with the print profiles $x_m$ to obtain an estimate of the banding defect period for a banding source at known frequency $f=1/t_{defect}$. A modified fast Fourier transform algorithm tuned to the frequency f and shifted in phase to reference the defect period to the defect source once-around instead of the beginning of the page may be used. Thus, for each page m, obtain a complex number describing the amplitude and phase of the defect frequency for that page:

$$R_m(f) = \frac{e^{-j2\pi f \hat{T}_m}}{N} \sum_{n=0}^{N-1} x_m[n] e^{-j2\pi f n/f_s} \quad (18)$$

The values $R_m(f)$ for $m=\{0, 1, \ldots, M-1\}$ are noisy realizations of the same complex number, with variation arising from phase jitter and noise within the prints. To determine the number of pages that gives the best signal-to-noise ratio, coherently add the values $R_m(f)$ to see which gives the highest amplitude estimate:

$$\max_{m \in \{0,1,\ldots,M-1\}} \frac{1}{m} \left| \sum_{i=0}^{m-1} R_i(f) \right| \quad (19)$$

The value of m that gives the highest amplitude estimate is called $M_{opt}(f)$. If more than $M_{opt}(f)$ prints are used, the increased phase jitter causes sufficient misalignment in the FFT of Equation 18 that the added benefit of the additional page is exceeded by its cost in added phase jitter.

Once the optimal number of pages is determined, it is possible to estimate the defect profile. The phase estimate is calculated from the first $M_{opt}(f)$ pages:

$$\hat{\phi}(f) = \angle \left( \sum_{i=0}^{M_{opt}(f)-1} R_i(f) \right) \quad (20)$$

As an initial amplitude estimate, coherently combine the data from the first $M_{opt}(f)$ pages as above:

$$\hat{A}_0(f) = \frac{1}{M_{opt}(f)} \left| \sum_{i=0}^{M_{opt}(f)-1} R_i(f) \right| \quad (21)$$

Next, obtain an estimate of the amplitude from the second set of $M_{opt}(f)$ pages, since the compounded phase jitter from the first set will only harm the phase estimate—and not the amplitude estimate—of the second set:

$$\hat{A}_1(f) = \frac{1}{M_{opt}(f)} \left| \sum_{i=M_{opt}(f)}^{2M_{opt}(f)-1} R_i(f) \right| \quad (22)$$

The final amplitude estimate, then, is the incoherent average of all complete sets of $M_{opt}(f)$ pages:

$$\hat{A}(f) = \frac{1}{\lfloor M/M_{opt}(f) \rfloor} \sum_{j=0}^{\lfloor M/M_{opt}(f) \rfloor - 1} \hat{A}_j(f) \quad (23)$$

Finally, extend this analysis to all of the harmonics of the defect frequency. The defect will have amplitude and phase for sinusoidal components at a spectrum of frequencies kf for $k=\{0, 1, \ldots, P-1\}$, where $P=f_s t_{defect}$ is the defect period in samples. For each k, it is thus possible to obtain an estimate of the amplitude and phase of the corresponding sinusoidal component by first calculating the metrics $R_m(kf)$ from Equation 18, determining the optimal number of pages $M_{opt}(kf)$ from Equation 19, and finding $\hat{\phi}(kf)$ and $\hat{A}(kf)$ by Equations 20 and 23. The estimate of the defect period is then, $$\hat{x}[n] = \sum_{k=0}^{P-1} \hat{A}(kf) \cos\left(2\pi \frac{n}{f_s} kf + \hat{\phi}(kf)\right), \quad (24)$$

for $n = \{0, 1, \ldots, P-1\}$

"Pages" could be interdocument zones, customer images zones, or printed pages. Image sensors used in the method could include any sensor that can determine a density profile, such as an offline scanner, an in situ full width array, or a point sensor such as an ETAC. Standard image processing algorithms are assumed for scanner calibration and set up, scanned image de-skewing, and profile generation. The modified fast Fourier transform expression in Equation 18 may include a windowing function on the profile as in a standard FFT.

Figure 8:
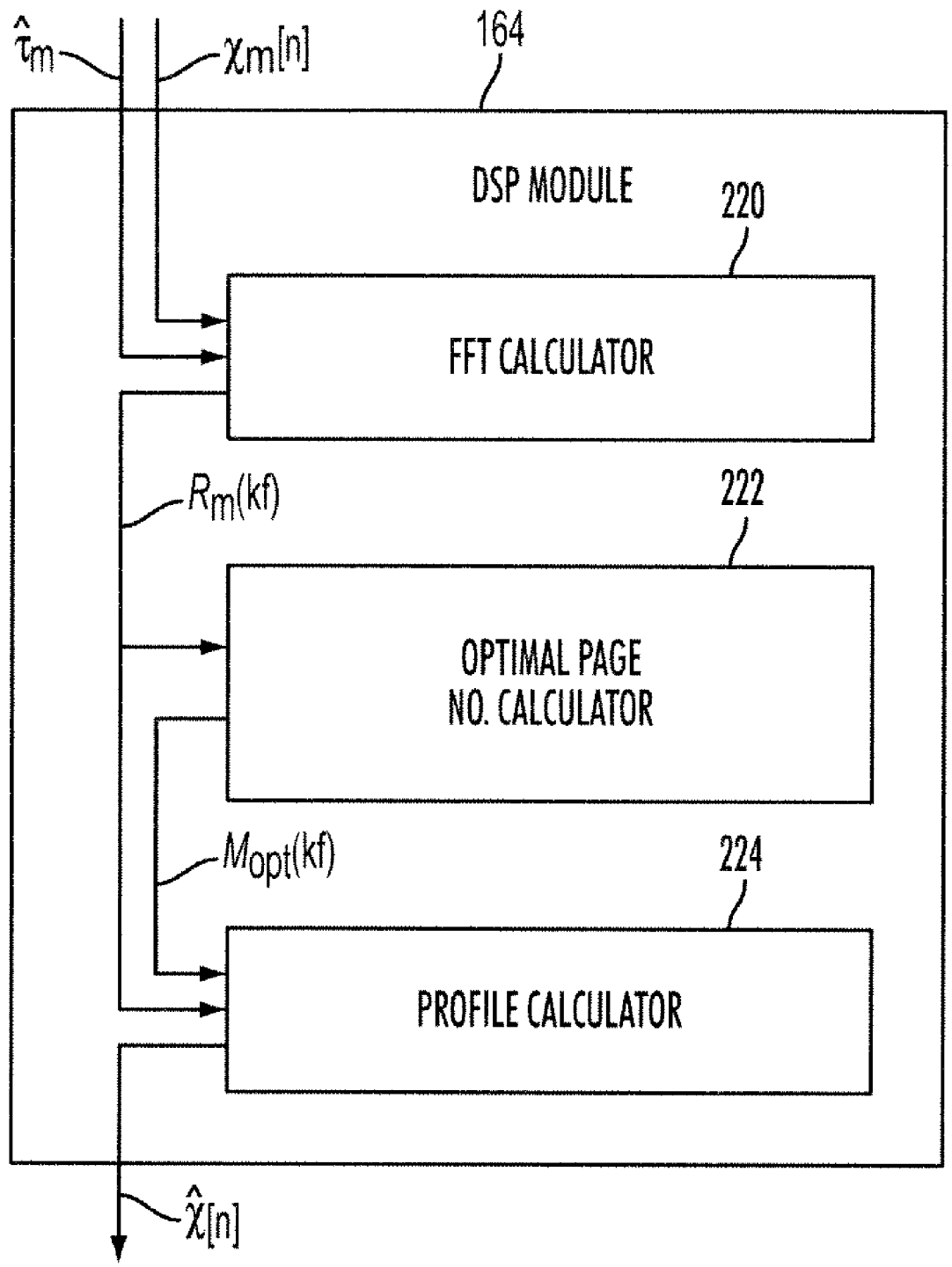
FIG. 8 is a block diagram of the DSP module.

The implementation of this method of determining an optimal defect profile requires the addition of a few low cost modules to the printer. FIG. 8 is a low-level depiction of these modules illustrating data flow. In this respect, the DSP module 164 may include an FFT calculator 220, an optimal page number calculator 222 and a profile calculator 224. The hardware may consist of a microprocessor with a block memory or, alternatively, a programmable gate array.

The defect estimate $\hat{x}[n]$, which is the final output of this system, can, for example, be fed to a banding correction subsystem of the printer, such as the motor control 114, which would use the estimated profile to compensate for the banding defect by adjusting the speed of the imaging surface (e.g., the PR shaft motor) 106 accordingly.

The banding correction subsystem then determines the compensation profile (122) by taking the banding defect estimate and adjusts its amplitude and its phase to be 180 degrees out of phase with the banding defect in order to minimize the banding (124). It uses the amplitude and phase of the motion system transfer function at the banding defect frequency in order to make the adjustment. In addition, it also uses the amplitude and phase of the printing system transfer function at the banding defect frequency in order to make the adjustment. This is performed as follows:

$$A_C(kf) = \hat{A}(kf) \cdot A_M(kf) \cdot A_P(kf)$$

$$\phi_C(kf) = \hat{\phi}(kf) + \phi_M(kf) + \phi_P(kf) + 180°$$

$$v_C[n] = \sum_{k=0}^{P-1} A_C(kf)\cos\left(2\pi \frac{n}{f_s} kf + \phi_C(kf)\right),$$

for $n = \{0, 1, \ldots, P-1\}$ where the terms $A_C$ and $\phi_C$ are the compensation amplitude and phase, respectively, the subscript M refers to the motor transfer function and the subscript P refers to the printer transfer function. The compensation velocity, $v_C$, is then added to the nominal velocity to form the final velocity to the motor 106. The compensation velocity is periodic with the defect and thus repeats every defect period. Thus, the system waits until the defect once-around signal returns (126) and applies the final velocity to the controller 114 (128).

This banding compensation system has been tested. We implemented the above the modules as set forth below:

1. Defect Once-Around Sensors. We obtained this signal by marking a reference point on our mechanical banding source and tracking the marker with a reflective sensor. A sudden change in the reflectance indicated that the reference marker had been spotted.
2. Transfer Function. This module was implemented on a computer processor running MATLAB. The transfer function simply inverted and scaled the defect profile so that the output was always between 0 and 2.5 V, the appropriate bounds for the motor control input. This transfer function module ignored the potential non-linear distortion that would arise due to varying PR surface speed, which would otherwise be absent if the PR surface exposure were actuated directly.
3. Function Generator. Here, we used a standard function generator that outputted a custom waveform loaded from the computer in (2) and triggered on the defect source once-around in (1).
4. Motor Control. The motor control module was a frequency modulator implemented by a complex programmable logic device (CPLD). The device accepted a voltage level between 0 and 2.5 V and outputs a 50% duty-cycle square wave with frequency between 1.318 KHz and 1.418 KHz. The mapping from input voltage level to output frequency was linear.
5. PR Shaft Motor. The rotational speed of this motor was controlled by the frequency of the input signal. The input range of 1.318 KHz to 1.418 KHz mapped linearly to rotational speeds in the range of 1.690 Hz to 1.818 Hz.

Figure 9:
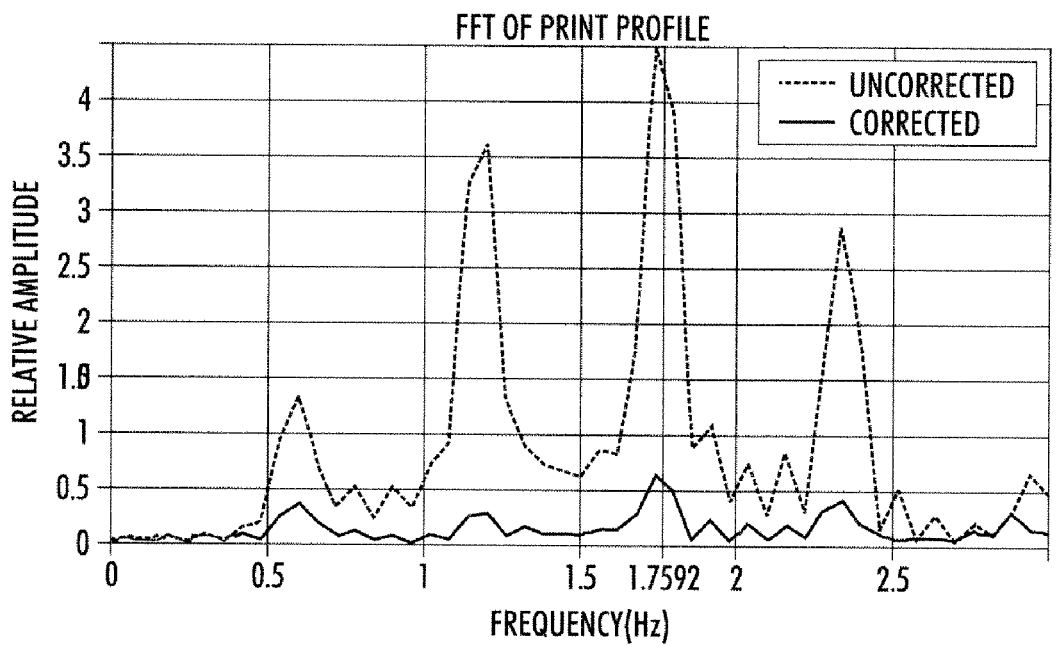
FIG. 9 depicts a FFT of print profiles before and after compensation.
Figure 10:
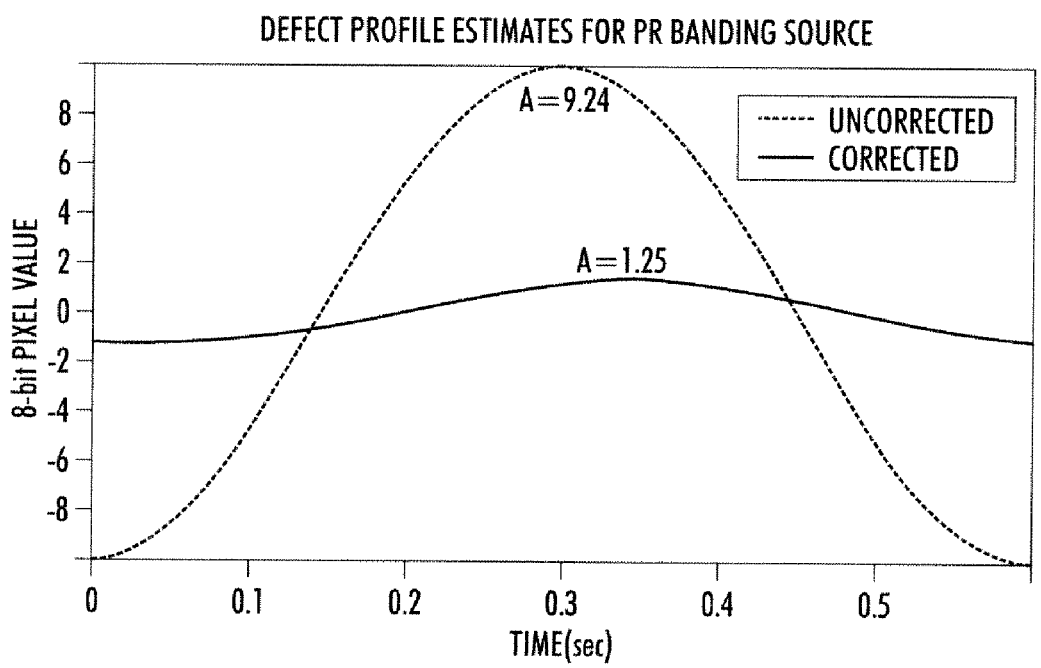
FIG. 10 shows the pure-tone defect estimate before and after compensation.

An artificial sinusoidal defect at the photoreceptor once-around frequency was injected into the print by varying the ROS power input voltage synchronously with the photoreceptor once-around. FIG. 9 depicts an FFT of two five-print series. The first series features the induced photoreceptor defect without compensation. The second series is taken from print profiles that are compensated according to our prototype. FIG. 10 shows the pure-tone defect estimate before and after compensation. These waveforms are the output $\hat{x}[n]$ of the defect estimator module, showing the significant reduction in defect amplitude after compensation. For compensation of defect sources at higher frequencies, we must also consider the phase lag and amplitude response of the motor.

In an alternative embodiment the banding profile estimate is obtained by what is known in the art as a ladder chart test target. Velocity variation may directly be obtained from the ladder chart. The compensation velocity profile may then be obtained from the velocity variation and modified based on the motor transfer function and the printer transfer function at the banding defect frequency. The compensation velocity profile may then be applied to the motor controller in order to reduce banding defects. The compensation velocity profile is then repeated every banding period, synchronized by the banding defect once around sensor.

Some portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to systems for performing the operations herein. These systems may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the present exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

It will be appreciated that variants of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of correcting periodic banding defects in a printing system, the method comprising:
 determining a banding profile estimate;
 determining a compensation profile;
 adjusting the compensation profile based on the transfer function of a motion system and the transfer function of a printing system;
 waiting until a defect once-around signal returns; and
 applying the output of the adjustment step to a controller controlling the speed of an imaging surface.

2. The method as set forth in claim 1, wherein the step of determining a banding profile estimate includes printing and measuring at least one test image.

3. The method as set forth in claim 2, wherein the at least one test image is printed in at least one of:
 an interdocument zone;
 a customer image zone;
 an image zone outside of the customer image zone; and
 a printed page.

4. The method as set forth in claim 2, wherein the at least one test image is measured using at least one of:
 a full width array sensor;
 a reduction optics image sensor;
 a camera;
 an external scanner;
 a point sensor;
 a density sensor;
 a reflectance sensor; and
 a color measuring sensor.

5. The method as set forth in claim 1, wherein the step of determining a banding profile estimate includes determining at least one of:
 a reflectance profile;
 a density profile; and
 a color parameter profile.

6. The method as set forth in claim 1, wherein the step of determining a banding profile estimate includes determining at least one of:
 a position profile;
 a position error profile;
 a velocity profile; and
 a velocity error profile.

7. The method as set forth in claim 1, wherein the step of determining a compensation profile includes determining a compensation profile from a banding profile estimate.

8. A system for correcting periodic banding defects in a printing system, the system comprising:
 a first module operative to determine a banding profile estimate;
 a second module operative to determine a compensation profile;
 a third module operative to adjust the compensation profile based on the transfer function of a motion system and the transfer function of a printing system;
 a fourth module operative to wait until a defect once-around signal returns; and
 a fifth module operative to apply the output of the adjustment step to a controller controlling the speed of an imaging surface.

9. The system as set forth in claim 8, wherein the printing system is at least one of:
 an electrophotographic printing system;
 an aqueous ink jet printing system; and
 a solid ink jet printing system.

10. The system as set forth in claim 8, wherein the imaging surface is at least one of:
 an imaging drum;
 an imaging belt;
 a photoreceptor drum;
 a photoreceptor belt; and
 a printed page.

11. A system comprising:
 a printer having an imaging surface;
 one or more defect once-around sensors;
 an imaging surface;
 a defect estimator that uses timing information to produce a synchronous defect estimate;
 a transfer function that translates a defect profile, in units of scanner reflectance or pixel value;
 a function generator that is triggered on the defect source once-around signal and outputs a continuous string of correction profiles at the frequency of the defect; and
 a motor controller that translates the correction profile voltage level into a signal that controls the speed of the imaging surface.

12. The system as set forth in claim 11, wherein the printer is at least one of:
 an electrophotographic printing system;
 an aqueous ink jet printing system; and
 a solid ink jet printing system.

13. The system as set forth in claim 11, wherein the imaging surface is at least one of:
 an imaging drum;
 an imaging belt;
 a photoreceptor drum;
 a photoreceptor belt; and
 a printed page.

14. The system as set forth in claim 11, wherein the defect estimator comprises:
 a timing module;
 a digital signal processing (DSP) module;
 an image sensor; and
 a banding correction subsystem.

15. The system as set forth in claim 14, wherein the DSP module further comprises:
 a Fast Fourier Transform calculator;
 an optimal page number calculator; and
 a profile calculator.

16. The system set forth in claim 15, wherein the image sensor comprises at least one of:
 a full width array sensor;
 a reduction optics image sensor;
 a camera;
 an external scanner;
 a point sensor;
 a density sensor;
 a reflectance sensor; and
 a color measuring sensor.

* * * * *